United States Patent [19]

Chilinski et al.

[11] Patent Number: 4,656,578
[45] Date of Patent: Apr. 7, 1987

[54] DEVICE IN THE INSTRUCTION UNIT OF A PIPELINE PROCESSOR FOR INSTRUCTION INTERRUPTION AND REPETITION

[75] Inventors: Herbert Chilinski; Klaus J. Getzlaff, both of Schoenaich; Johann Hajdu; Stephan Richter, both of Boeblingen, all of Fed. Rep. of Germany

[73] Assignee: International Business Machines Corporation, Armonk, N.Y.

[21] Appl. No.: 646,873

[22] Filed: Sep. 4, 1984

[30] Foreign Application Priority Data

Sep. 16, 1983 [EP] European Pat. Off. ........ 83109176.4

[51] Int. Cl.⁴ ............................................. G06F 13/00
[52] U.S. Cl. ................................................... 364/200
[58] Field of Search ......... 364/200, 900, 200 MS File

[56] References Cited

U.S. PATENT DOCUMENTS 4,075,688  2/1978  Lynch .................................. 364/200
4,539,635  9/1985  Boddie et al. ....................... 364/200

Primary Examiner—Archie E. Williams
Assistant Examiner—Emily Yue Chan
Attorney, Agent, or Firm—John H. Bouchard

[57] ABSTRACT

In the processing of instructions in data processing systems it is not always possible to execute these instructions without interruption since particular situations, in the following called events can occur which necessitate a short interruption for executing the operations caused by such events before continuing the interrupted instruction processing. Such repetition however is only possible when the contents of the operation register containing the instruction is frozen during the interruption. Such a situation requires two actions: the first is the execution of a forced operation to resolve the event. The second action is a repetition of the instruction and execution phase of the interrupted instruction.

5 Claims, 5 Drawing Figures

DEVICE IN THE INSTRUCTION UNIT OF A PIPELINE PROCESSOR FOR INSTRUCTION INTERRUPTION AND REPETITION

BACKGROUND OF THE INVENTION

1. Field of the Invention

The invention relates to a device in the instruction unit of a pipeline processor for instruction interruption, as a function of an event necessitating such an interruption, and for the repetition of instructions after the resolution of the event.

2. Description of the Prior Art

During instruction processing in data processing systems it is not always possible to perform such processing without interruptions since special situations, in the following called events, can occur which necessitate a short interruption to perform the operations caused by such events before continuing the interrupted instruction processing.

Under the present conditions this refers less to sequentially continuing, at the point of interruption, the next instruction than to processing, including a repetition of the last instruction which had detected the event and which had been interrupted before being completed, e.g. with storing an event obtained thereby, because this instruction requires information which can not be made available until the execution of the event.

A typical situation of that kind appears e.g. in data processing systems with a cache provided as a buffer between the main storage and the processing unit. A directory always records the address of the data in the cache. Upon each access of the processor to the cache the directory is interrogated as to whether the data required are stored in the cache so that they can be provided by the cache for the execution of this instruction. If the current address with the necessary data is not located in the directory, the data from the main storage have to be stored in the cache which in turn causes a new registration in the directory. It is only now that instruction processing can be resumed with the repetition of the latest instruction.

This instruction repetition however is only possible if during the interruption the contents of the operation register are stored which contains the instruction, i.e. substantially the operation code and the operand addresses and, if necessary, additional information which can still be comprised in the instruction. Known data processing systems use for that purpose back-up registers whose number depends on the degree of overlapping instruction processes, and which permit the return to the instruction to be repeated, and the re-establishing of the source data.

Apart from this additional amount of components undesirable per se, this kind of instruction repetition involves a significant loss of time since the entire instruction which can comprise one to several clocks (instruction cycles) has to be repeated.

SUMMARY OF THE INVENTION

It is therefore the object of the invention to perform the processing of specific events necessitating an instruction repetition in such a manner that, on the one hand, no additional back-up registers will be required, and on the other the loss of time resulting from an instruction repetition will be kept as short as possible.

This object of the invention is achieved by the features specified in the main claim.

Further advantageous embodiments and developments of the subject of the invention are given in the subclaims.

The present invention thus presents the advantage that the processing of specific events necessitating an instruction interruption in the data processing system can be implemented without any additional back-up registers, and that furthermore the loss of time caused by the instruction repetition is kept as short as possible.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

In the following, the invention will be described in detail with reference to an embodiment specified by drawings. The drawings show the following.

DETAILED DESCRIPTION OF THE PREFERRED EMBODIMENT

Figure 1:
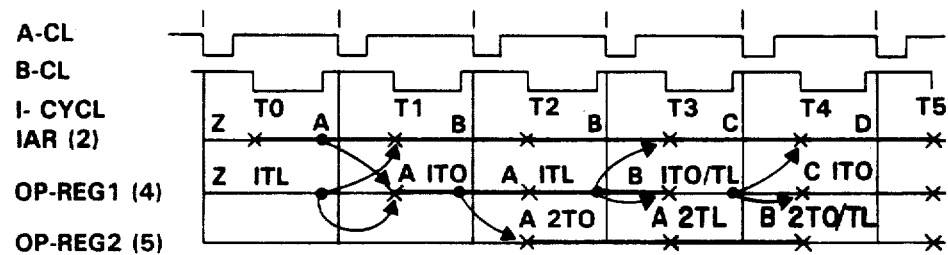
FIG. 1 a diagram specifying overlapping instruction processing

As an example, an overlapped instruction processing is assumed as depicted by FIG. 1. Lines 1 and 2 from the top of this figure represent the position with respect to time of the A and B clocks A-CL and B-CL with regard to the instruction clock or instruction cycle I-CYCL represented continuously in line 3 with T0 to T5. These A and B clocks are used mainly for the operation of the master/slave flipflops (FIG. 2) which are the main structural components of the processor logic.

In the instruction sets of most of the data processing systems there exist instructions of different length, i.e. instructions requiring one to several instruction cycles for their processing. Instruction processing in turn is usually carried out in two phases, i.e. the instruction phase, I phase, and the execution phase, E phase. In an instruction that is executable interpretatively rather than directly the main storage or its buffer is read out in the instruction phase within three instruction cycles to fetch the instruction, the control storage is read out to fetch the controlling microinstruction, and the microinstruction is decoded. This decoding initiates the actual phase of execution of the instruction which is performed within four instruction cycles, i.e. the read-out of the first operand, the read-out of the second operand with the respective transfer of the operands into the input registers of an arithmetic and logic unit ALU, the actual arithmetic or logic processing of the operands, and the storing of the result in a defined storage location.

Figure 2:
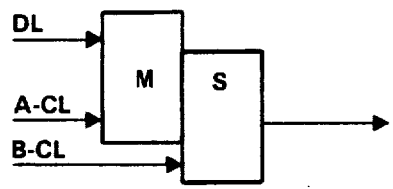
FIG. 2 a basic representation of a master/slave flipflop.

In a pipeline processor, i.e. a processor with overlapped instruction processing a partial processing of several instructions can be carried out per instruction cycle Ti, depending on the degree of overlapping. In the example of FIG. 2, with two operation registers OP-REG1 and OP-REG2 partial processings of three different sequential instructions per instruction cycle Ti are possible after a predetermined initial run. Starting from a first instruction cycle T0, the instruction with the instruction address in the instruction register IAR, e.g. A, is read out of the instruction storage. In the next instruction cycle T1, the second one, both operands are fetched, and at the same time the next instruction with instruction address B is fetched from the instruction storage.

In the third instruction cycle T2, the operands are arithmetically or logically combined in the ALU, and the result is stored in a predetermined register or a storage location; furthermore, the next pair of operands is fetched and simultaneously the next instruction, i.e. the third one, is selected from the instruction storage.

A successful branch instruction would interrupt the thus structured pipeline, and establish a new pipeline. Here, too, there is an initial run of two instruction cycles to fill the pipeline in case of a three-way overlapping.

The two operation registers (OP-REG1, OP-REG2) 4 and 5 serve for overlapping instruction processing, with OP-REG1 (4) selecting the source and OP-REG2 (5) the target. The term source refers to the operands or other data (e.g. of an address) which are to be processed. Target refers to those components of the data processing system which produce the result and determine the destination to which the result will be transferred.

Figure 3:
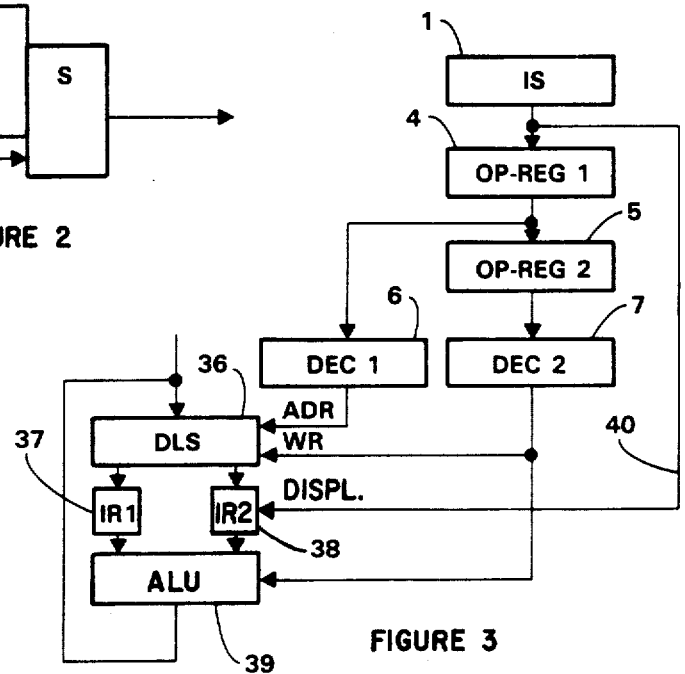
FIG. 3 a block diagram to explain overlapped instruction processing.

The processor data flow depicted in FIG. 3 shows that the instruction storage (IS) 1 successively transfers the instructions to the operation register OP-REG1 (4). This operation register (4) transfers in the subsequent instruction cycle the instruction it contains into the operation register OP-REG2 (5) so that with the next instruction it can again be loaded from the instruction storage 1. The output of the respective operation register 4 and 5 is connected to a respective operation decoder (DEC1) 6 and (DEC2) 7.

It is furthermore indicated that the instruction in operation register 4 selects over operation decoder 6 the source, i.e. the registers in the data local store (DLS) 36. The instruction in operation register 5 selects over operation decoder 7 the target, in the present case the input registers (IR1, IR2) 37 and 38 of the arithmetic and logic unit (ALU) 39.

If an instruction reaches operation register 4 the operands are fetched from data local store 36. For that purpose, e.g. the contents of two general registers or of one base register, and a displacement are read into the input registers 37 and 38 of the arithmetic and logic unit 39. The contents of the base register and of the displacement are transferred by instruction storage 1 directly over an individual connection 40.

In the next instruction cycle, operation register 4 transfers its contents to operation register 5 which selects the target, e.g. the function of arithmetic and logic unit 39, as well as the result register, whereas at the same time operation register 4 receives the next instruction, and selects the next source.

An overlapping appears also on the DLS/ALU side of the processor. The DLS reads out the next operands while the actual operands in the ALU generate a result. This overlapping is the basic principle of pipeline computers which is possible mainly because of the triple control of the DLS. For instructions using the storage operands, separate connection 40 directly serves for computing the base registers and the displacement, which also overlap with other processing actions.

Figure 4:
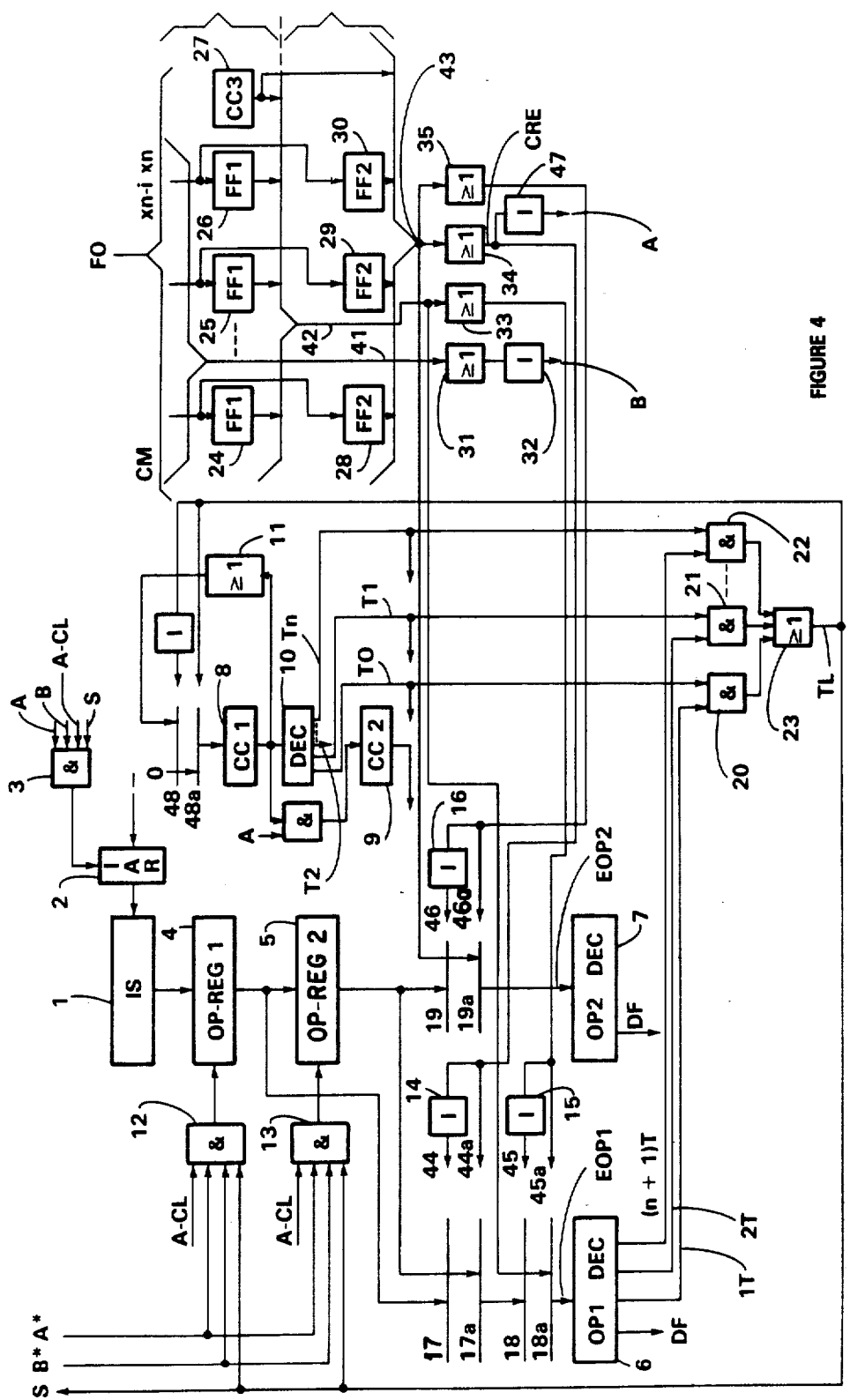
FIG. 4 a block diagram of part of the instruction unit in which the invention is used, and FIG. 5 a diagram representing the operational mode of the arrangement according to FIG. 3.

As shown by FIG. 4, operation registers 4 and 5 have their own associated instruction cycle counters (CC1 and CC2) 8 and 9 for specific control operations. Thus, operation register 4, jointly with instruction cycle counter 8 which supplies the clock pulses 1Ti initiates the control of the source selection, while operation register 5 in connection with instruction cycle counter 9 which supplies clock pulses 2Ti takes over the control of the target modification.

It can be concluded from FIG. 1 that in the first instruction cycle T0 the instruction with the address A which is in instruction address register 2 is fetched and placed into operation register 4. This is carried out in the second cycle T1 which however is the first instruction cycle (1T0) with respect to cycle counter 8, but as this is a two-cycle instruction, instruction cycle counter 8 associated to operation register 4 has to generate one further clock pulse which is designated 1TL.

With a corresponding time shift, this control also applies to operation register 5. Instruction cycle counter 9 generates two clock pulses, too, i.e. 2T0 and 2TL.

Starting from the above described machine design the actual inventive idea will be described in the following. An event, as e.g. the none-availability of an operand in the cache could occur during an instruction cycle A 2TL. The point now is not to repeat the entire instruction with the address A after the resolution of the event, i.e. when the cache is again able to supply the necessary operand, but only the last instruction cycles A 1TL and A 2TL, so that there is only a very small loss of time compared with a repetition of the entire instruction, i.e. of all instruction cycles, so that instruction address A is no longer required, either, with the consequence that back-up registers are required neither for the instruction address nor for the operands.

The repetition of instruction cycles A 1TL and A 2TL without additional back-up registers is achieved in that the corresponding event signal, e.g. the above mentioned event where the cache does not have the necessary operand available, and which in FIG. 4 is marked CM, immediately maintains (freezes) the contents of instruction address register 2 and of operation registers 4 and 5. The contents of these registers remain maintained (frozen) until the repetition of A 1TL inclusively.

It is furthermore necessary that after the resolution of the event, i.e. when the desired operand has been loaded from the main storage into the cache and is thus available for the execution of the instruction, operation register 5 and also instruction cycle counter 9 are switched for the duration of one instruction cycle to the output of operation register 4 and the associated instruction cycle counter 8.

This switching presents further advantages since owing to the switching-off of the outputs of the two operation registers during the resolution of the event no control signals are activated any longer by the outputs of these switched-off operation registers. It is furthermore of advantage to switch all event functions, instead of the contents of the operation registers, to their outputs so that an optimum distribution over the individual decoding functions is achieved which on the whole results in a smaller amount of connecting points.

Figure 5:
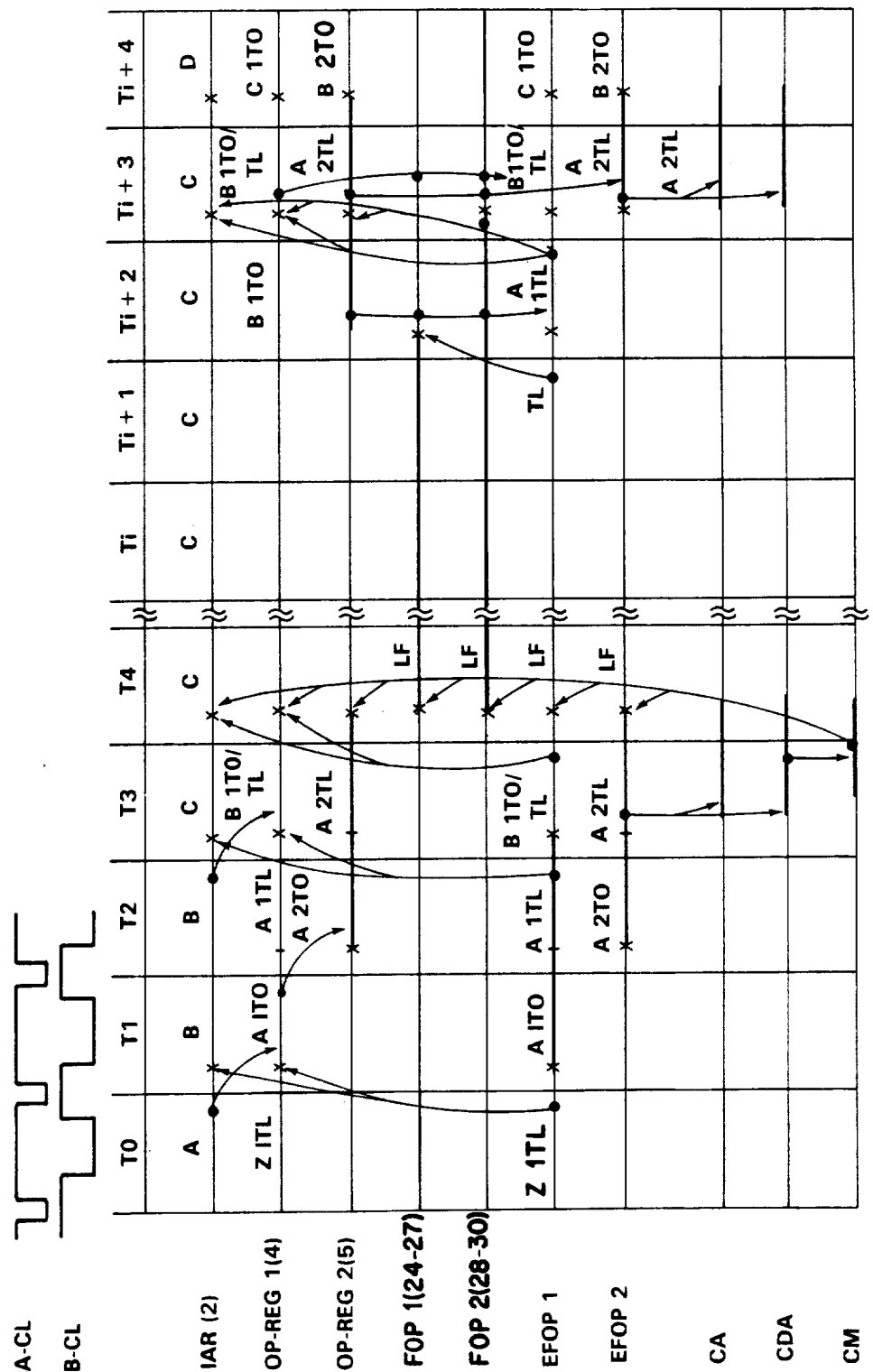

The section of the instruction unit of the data processing system as depicted in FIG. 4 shows the structure of the circuitry, and in connection with FIG. 5 also the operation of the invention in detail.

At instruction cycle time T0 instruction address A is in instruction address register (IAR) 2. In the next instruction cycle T1, the instruction is read from instruction storage 1 into operation register 4, and at the same time the next instruction address B is read into instruction address register 2. Furthermore, the instruction now in operation register 4 which is a two-cycle instruction is available as an effective operation EOP1, in combination with instruction cycle time T0 of its associated instruction cycle counter (CC1) 8, in the general mode of writing A 1T0. In decoder 6, this effective operation EOP1 is decoded, and data flow control signals DF are generated which control the instruction phase I-PH of the instruction. Therefore, the instruction travels from operation register 4 to operation decoder (OP 1 DEC) 6 because gates 17 and 18 are activated, since at the respective time there had been no event which would require the execution of a forced operation including the repetition of an instruction. As there are therefore no signals CM or Xn-1 and/or Xn for the request of forced operations FO, the multi-wire lines 41, 42 and 43 carry a signal corresponding to the binary 0. The number of wires in line 41 corresponds to the number of the various possible event signals. The number of wires in line 42 depends on the number of event signals, since each event signal is also transferred to a flipflop 1, and in parallel thereto to a flipflop 2, line 42 transmitting the outputs of flipflop 1 (24 to 26) as well as the outputs of instruction cycle counter (CC3) 27. Line 43 contains as many wires as line 42 since here, too, the outputs of flipflops 2, i.e. 28 to 30, as well as the output lines of cycle counter 3 are provided over this line 43.

The signals respectively stored in parallel in flipflops 1 form, if necessary after having been combined with further mode bits, a data flow control word FOP1 for forced operations, like the data also stored in parallel in flipflops 2, i.e. 28 to 39 which, also combined with mode bits, form the control word FOP2 for forced operations which transferred to the corresponding decoders 6 and 7 control the execution of forced operations in connection with instruction cycle counter 27.

The wires of above mentioned lines 41 to 43 are assembled for control purposes via OR gates 31, 33, 34 and 35, the output of OR gate 31 being provided via an inverter 32 whose output is marked B*. The output of inverter 47 is marked A*. These outputs are also transferred to the inputs of AND gates 3, 12 and 13. A* also controls AND gate 48.

These AND gates 3, 12 and 13 also have two further inputs, one receiving setting signal S, and the other clock signal A-CL.

AND gate 3 controls via its output instruction address register 2 so that in the next instruction cycle it can be loaded with a new instruction address. There will however be no such loading if the coincidence condition for this AND gate 3 is not satisfied.

Similarly, AND gates 12 and 13 effect the loading, or the non-loading respectively of operation registers 4 and 5.

In standard operation, after having been read out with address A in the first instruction cycle, e.g. T0 represented in the third line from above in FIG. 5, the instruction reaches in standard operation in the second instruction cycle T1 operation register 4 with activated gate 12, and from the output of operation register 4 via gates 17 and 18 as an effective operation EOP1 operation decoder 6. Since there are no event signals CM, ..., Xn-1 and Xn, the outputs of OR gates 31, 33, 34 and 35 generate a signal corresponding to the binary zero. The output signal of OR gate 34 is applied at the input of inverter 14, and is inverted into a signal corresponding to the binary ONE which is applied at control input 44 of gate 17, switching it. Similarly, the output signal of OR gate 33 is applied at the input of inverter 15 so that the latter switches gate 18 via control input 45.

As shown in FIG. 5 in the continuous numbers of instruction cycle T1, the instruction with the address A in operation register 4 is related to instruction cycle time 1T0 of instruction counter 8. Instruction cycle time T0 of instruction counter 8 is marked 1T0 in FIG. 5.

In the next continuously numbered instruction cycle T2, the instruction reaches operation register 5 and is related there to instruction cycle time T0 of instruction cycle counter 9. In FIG. 5, this cycle time is marked 2T0.

Since it is assumed that there has still been no event gate 19 is switched also via inverter 16 and control input 46, so that the instruction reaches operation decoder 7 as an effective operation EOP2. The input signal of inverter 16 is derived from the output of OR gate 35.

Operation decoder 6 also comprises a circuit arrangement which, apart from data flow gate control signals DF, also generates output signals 1T, 2T, ..., (n+1)T which indicate the cycle length of the respectively decoded instruction. 1T means that there is one instruction with the length of one instruction cycle T which on the output line of decoder 6 marked 1T supplies an output signal. Instructions of a different instruction cycle length are similarly marked.

As depicted in FIG. 5, the instruction with address A is an instruction whose length extends over two instruction cycles and whose last cycle TL corresponds to the second instruction cycle T1 of decoder 10. The circuit arrangement consisting of components 10, 20, 21, 22 and 23 produces signal TL which corresponds to the last instruction cycle of an instruction, irrespective of the latter's length. As shown in FIG. 4, this control signal TL serves in combination with AND gate 3 for taking over a new instruction address in instruction register 2, and in combination with AND gates 12 and 13 for taking over new instructions in operation registers 4 and 5.

As also shown in FIG. 5, there occurs in instruction cycle T3 (continuously numbered) an event which is marked CM and which means that an operand required for executing the instruction is not available in the cache. This event can be detected in that there is an access to this buffer storage (control signal CA), and that the cache directory is searched (signal CDA), but without success.

Up to this moment which occurs in instruction cycle T3 no new instruction addresses could be loaded into instruction address register 2 during each instruction cycle because of the gradual build-up of the pipeline. Consequently, it is only address C of the third instruction that is in instruction address register 2. Therefore, upon event CM operation register 4 contains the instruction with the address B, and in the associated instruction cycle counter 8 cycle time 1T0 or 1TL, respectively, is indicated because this instruction is a one-cycle instruction. Operation register 5 contains the instruction with address A, with instruction cycle counter 9 being set to 2TL.

Owing to the coupling of instruction cycle counters 8 and 9 shifted by one instruction cycle time (9 is loaded by the output of 8 before the latter receives via modifier 11 the value increased by one which is effective at that moment, or before the initial position "0" is read in when there is an instruction cycle TL at the output of 8) 9 displays a cycle time lower by 1. Furthermore, FIG. 5 shows that instruction cycle counter 8 is always one step ahead of instruction cycle counter 9.

Owing to the pipeline effect, the appearance of event CM causes a specific situation: the source selection data in operation register 4 are always overwritten by the new data which already exist upon the event being detected. Such a situation demands two actions: first, the execution of a forced operation, in the present case the re-loading of the cache from the main storage with data comprising the operand missed in the preceding cycle.

The second action is a repetition of the instruction and execution phase. The instruction phase (A 1TL) overlaps with the preceding instruction execution cycle of the forced operation activated for the resolution of the event. As specified above, source and target are selected during this phase of execution.

The forced operation which includes the repetition of the preceding instruction cycle TL starts with the address of the forced operation (routine) being read into the operation register for forced operations FOP1. The appearance of event signal CM stops via A* and AND gate 48 the instruction cycle counter 9 that is associated to operation register 5; its count 2TL is frozen. The forced operation is now executed like any other microinstruction-encoded operation but by means of the control information comprised in the operation registers for forced operations FOP1 and FOP2.

When the re-loading operation is completed, in the example of FIG. 5 this applies to the continuous instruction cycle Ti+2, the source selection of the interrupted instruction is repeated in that operation register 5 is used as source selector even if it normally uses target selection decoder 7. Through the control signals corresponding to the binary ONE at the control inputs 44a of gate 17a and 45a at gate 18a, the contents of operation register 5 is switched as an effective operation EOP1 to operation decoder 6, and thus the source is selected.

In the subsequent cycle Ti+3, the output of operation register 5 is again transferred as an effective operation EOP2 to operation decoder 7 which performs the target selection. This is possible because at OR gates 31, 33, 34 and 35 a signal again corresponding to the binary zero is applied. In this manner, execution cycle 2TL exclusively is repeated without any back-up registers or duplicated circuits being required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In an instruction unit of a pipeline processor, a device means for interrupting an execution of an instruction in response to an occurrence of an event and for repeating the execution of said instruction following the resolution of said event, said event being characterized by the generation of an event signal, said device means comprising:

first operation register means for storing said instruction, said instruction being maintained in said first operation register means in response to said event signal;

first instruction cycle counter means for providing a count of machine cycles relating to the execution of said instruction stored in said first operation register means, the contents of said first instruction cycle counter means being maintained in response to said event signal;

second operation register means responsive to said event signal for storing further instructions and control information;

second instruction cycle counter means for providing a count of machine cycles relating to the execution of said further instruction stored in said second operation register means;

operation decoder means for decoding an instruction;

switch means interconnected between said operation decoder means and said first operation register means, said first instruction cycle counter means, said second operation register means and said second instruction cycle counter means and responsive to said event signal for transferring said further instructions and control information and said count from said second operation register means and said second instruction cycle counter means to said operation decoder means in response to said event signal.

2. The device means of claim 1, wherein said first operation register means comprises a first operation register and a second operation register, said switch means switching the contents of said second operation register to the output of said first operation register when said occurrence of event is terminated.

3. The device means of claim 2, wherein said operation decoder means comprises a first operation decoder and a second operation decoder, and wherein said device means further comprises:

first gate means disposed between and interconnecting said first operation register and said first operation decoder and responsive to said event signal for switching the contents of said second operation register to an input of said first operation decoder in response to said event signal thereby preventing the contents of said first operation register from reaching an input of said first operation decoder; and second gate means disposed between and interconnecting said second operation register and said second operation decoder and responsive to said event signal for inhibiting the transfer of the contents of said second operation register to the second operation decoder in response to said event signal.

4. The device means of claim 3 further comprising:

further gate means connected to said second instruction cycle counter means and responsive to said event signal for freezing the counting of said machine cycles performed by said second instruction cycle counter means associated with the execution of said further instruction stored in said second operation register means in response to said event signal, said count being provided by said second instruction cycle counter means being reinitiated and the execution of said further instruction continuing when said occurrence of event is terminated.

5. The device means of claim 4, further comprising:
circuit means connected to an output of said second operation register means and responsive to said further instructions and control information and connected to an input of said first gate means and said second gate means for controlling the operation of said first and second gate means.

* * * * *